(12) United States Patent
Coffey et al.

(10) Patent No.: US 6,854,895 B2
(45) Date of Patent: Feb. 15, 2005

(54) MEDIA WALL CONVERTER AND HOUSING

(75) Inventors: Joseph Coffey, Burnsville, MN (US); Vern Loch, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/199,974

(22) Filed: Jul. 18, 2002

(65) Prior Publication Data

US 2004/0013369 A1 Jan. 22, 2004

(51) Int. Cl.[7] ............................................. G02B 6/36
(52) U.S. Cl. ................... 385/53; 439/577; 439/536
(58) Field of Search .................... 385/53, 92, 55, 385/88, 134, 147; 439/577, 536, 557

(56) References Cited

U.S. PATENT DOCUMENTS

| | | | |
|---|---|---|---|
| 4,526,431 A | | 7/1985 | Kasukawa |
| 5,104,243 A | | 4/1992 | Harding ....................... 385/84 |
| 5,506,921 A | * | 4/1996 | Horie .......................... 385/53 |
| 5,561,727 A | * | 10/1996 | Akita et al. ................... 385/88 |
| 5,767,999 A | | 6/1998 | Kayner ........................ 359/163 |
| 5,956,444 A | * | 9/1999 | Duda et al. ................... 385/53 |
| 6,178,096 B1 | | 1/2001 | Flickinger et al. .......... 361/816 |
| 6,220,873 B1 | | 4/2001 | Samela et al. ............. 439/76.1 |
| D449,300 S | | 10/2001 | Bentz et al. ............... D14/357 |
| D455,122 S | | 4/2002 | Bentz et al. ............... D13/133 |
| 6,364,535 B1 | | 4/2002 | Coffey ......................... 385/53 |

FOREIGN PATENT DOCUMENTS

| | | |
|---|---|---|
| DE | 39 07 236 A1 | 9/1990 |
| DE | 197 32 297 A1 | 4/2002 |
| FR | EP 0 677 757 A1 | 10/1995 |
| NL | EP 0 456 298 A1 | 11/1991 |

OTHER PUBLICATIONS

U.S. patent application Ser. No. 10/268,064, entitled *Wall Mount Chassis,* filed on Oct. 8, 2002, Inventors: Gordon P. Clark, Loren J. Mattson.

* cited by examiner

*Primary Examiner*—Javaid H. Nasri
(74) *Attorney, Agent, or Firm*—Merchant & Gould P.C.

(57) ABSTRACT

A media wall converter that fits into an existing faceplate of a wall outlet. The converter has a front section for housing converter circuitry and a rear section for housing optical components. The rear section of the adapter housing resides behind the faceplate while the front section of the housing extends into a work area from the faceplate.

26 Claims, 17 Drawing Sheets

US 6,854,895 B2

MEDIA WALL CONVERTER AND HOUSING

FIELD OF THE INVENTION

The present invention relates generally to telecommunications equipment and, more particularly, to a media converter and its housing for providing conversion between copper and optical fiber for a variety of signaling and/or network applications.

BACKGROUND OF THE INVENTION

Various electrical/optical connectors are known for use in the telecommunications industry to transmit voice, data and video signals. A common connector configuration includes a faceplate or outlet that is mounted on a structure such as a wall. The faceplate defines a plurality of openings in which connectors can be mounted. A typical connector includes a modular jack defining a port sized for receiving a conventional modular plug. Other conventional types of connectors include SC connectors, ST connectors, BNC connectors, F connectors and RCA connectors, for example.

With respect to electrical/fiber optic connectors for the telecommunications industry, it is important that such connectors be easily installed, easily accessible after installation and easily repaired and/or upgraded. In this regard, it is desirable for the connector to be front mounted within their corresponding faceplates. By front mounting the connectors, the connectors can be accessed without requiring their corresponding faceplates to be removed from the wall.

In addition, as technologies advance, it is desirable to provide an adapter that is easily upgradable in a cost efficient manner. For example, it is desirable to provide an adapter that can be upgraded to operate at faster transmit rates or different protocols without replacing the entire adapter.

Furthermore, it is desirable to provide a media converter housing that adapts to any standard SC duplex footprint. It is also desirable to provide a converter housing that does not require modification of an existing optical wall outlet box because the fiber depth behind the wall plate is the same as a standard SC duplex adapter.

It is also desirable to provide a media converter housing that is compact in design, eliminates the need for separate power supply and expensive optical patch cords and provides conversion of signals from one protocol to another at the work area wall plate.

SUMMARY OF THE INVENTION

According to a first aspect of the invention, there is provided a media converter housing including a front section and a rear section. The front section has a first compartment configured to house a printed circuit board for converting signals from a one protocol to another. The rear section has a second compartment configured to house a portion of an optical termination. The rear section has an external shape configured to fit in a wall outlet receptacle so that when the media converter is mounted in a wall outlet receptacle, the front section protrudes from the wall outlet receptacle.

According to a second aspect of the invention, there is provided a media converter housing having a front and rear section. The front section has a first compartment for housing circuitry for converting signals from one protocol to another. The rear section has a second compartment configured to house a portion of an optical termination. The rear section has the same footprint as a standard SC duplex adapter and fits in an optical outlet receptacle.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE PREFERRED EMBODIMENTS

Reference will now be made in detail to preferred aspects of the present invention that are illustrated in the accompanying drawings. Whenever possible, the same reference numbers will be used throughout the drawings to refer to the same or like parts.

Figure 1:
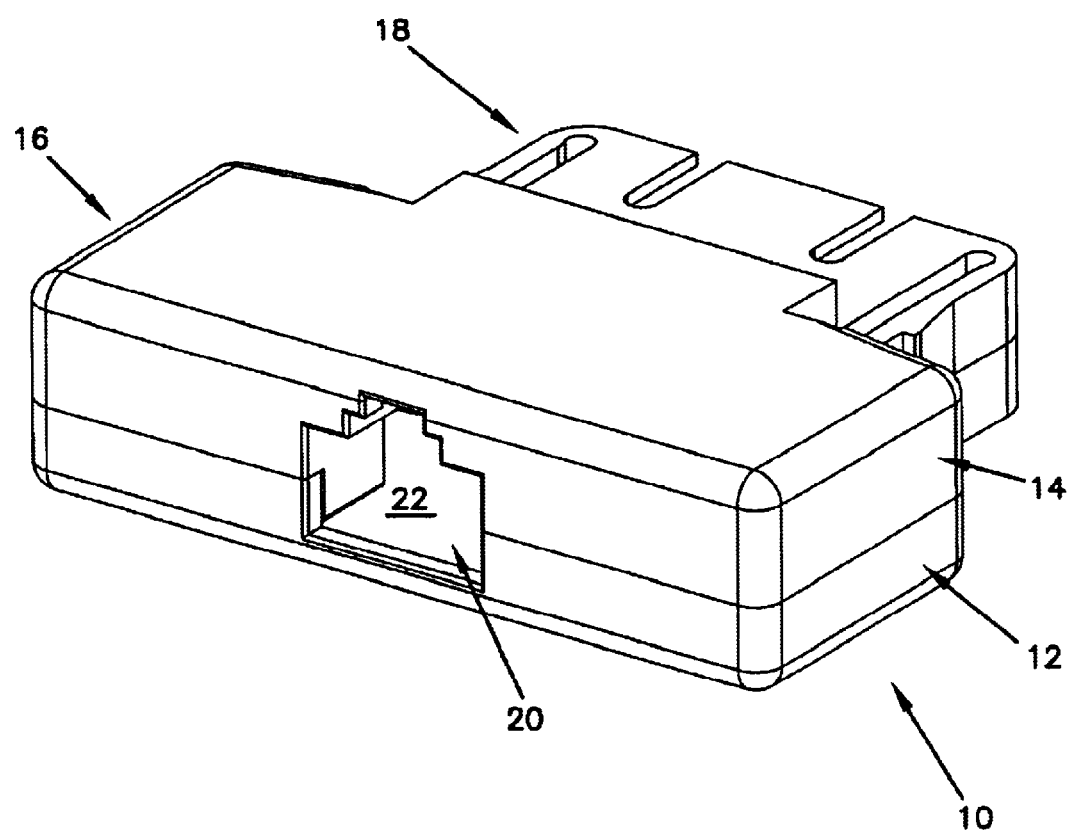
FIG. 1 is a front perspective view of a media converter housing according to a preferred embodiment of the present invention.
Figure 2:
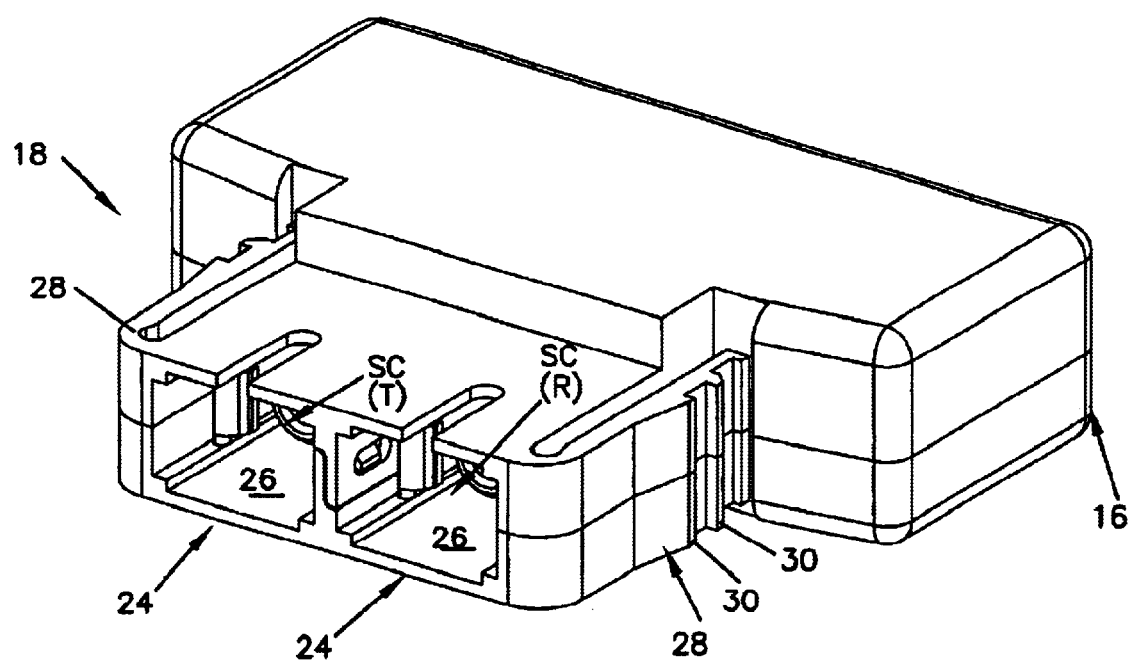
FIG. 2 is a rear perspective view of the converter housing shown in FIG. 1.

FIG. 1 is a front perspective view of a media converter housing according to a preferred embodiment of the present invention. The housing 10 includes a bottom housing member 12 and a top housing member 14 that are mated together to provide a front section 16 and a rear section 18. The front section 16 has a first port 20 defined therein to provide access to a front compartment 22 located inside the front section 16. FIG. 2 is a rear perspective view of the converter housing 10 shown in FIG. 1. The rear section 18 has second ports 24 formed therein to provide access to rear compartments 26 located inside the rear section 18. The rear section 18 of the housing 10 also has spring arms 28 located on opposite exterior sides of the rear section 18. Each arm 28 has a plurality of protrusions 30 formed at one end that are used to mount the housing in a wall outlet receptacle as will be described hereinafter. The rear section 18 is configured to fit in an existing optical wall outlet and will be described hereinafter. When the housing is mounted in a wall outlet, the front section 16 remains external to the wall outlet and the rear section 18 has the same footprint or profile as a standard SC duplex adapter as will be seen with respect to FIGS. 12–17 so that no modification of the outlet box is required in order to use any of the embodiments of the media converter housing described herein.

Figure 3:
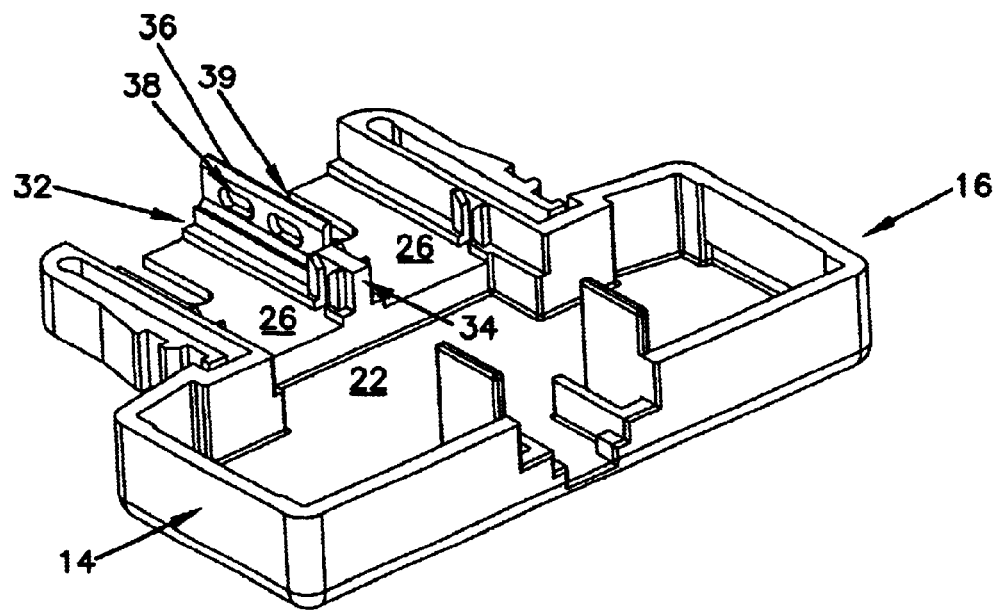
FIG. 3 is a front perspective view of the bottom housing member of the converter housing shown in FIG. 1.
Figure 4:
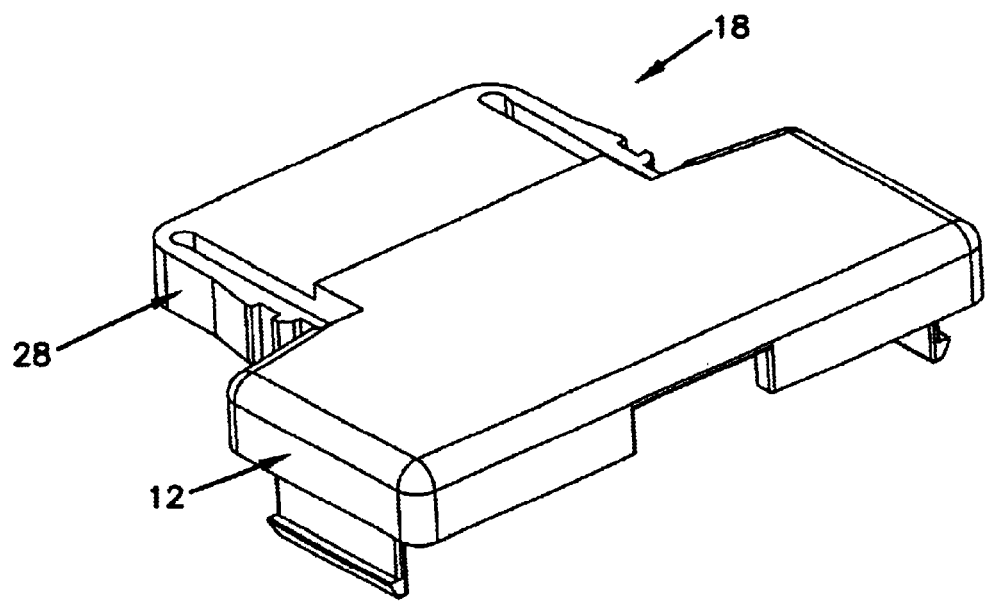
FIG. 4 is a front perspective view of the top housing member of the converter housing shown in FIG. 1.

FIG. 3 is a front perspective view of the bottom housing member 14 of the converter housing 10 shown in FIG. 1. A front compartment 22 is defined in the front section 16 of the housing and rear compartments 26 are defined in the rear section 18 of the housing 10. A wall 32 divides the interior of the rear section into the two compartments 26. The wall 32 has a first portion 34 and a second portion 36 that is thinner than the first portion 34 and also includes a plurality of apertures 38 formed therein which will be described in greater detail hereinafter. The rear section 18 also has grooves 39 formed therein. FIG. 4 is a front perspective view of the top housing member 12 of the converter housing 10 shown in FIG. 1.

Figure 5:
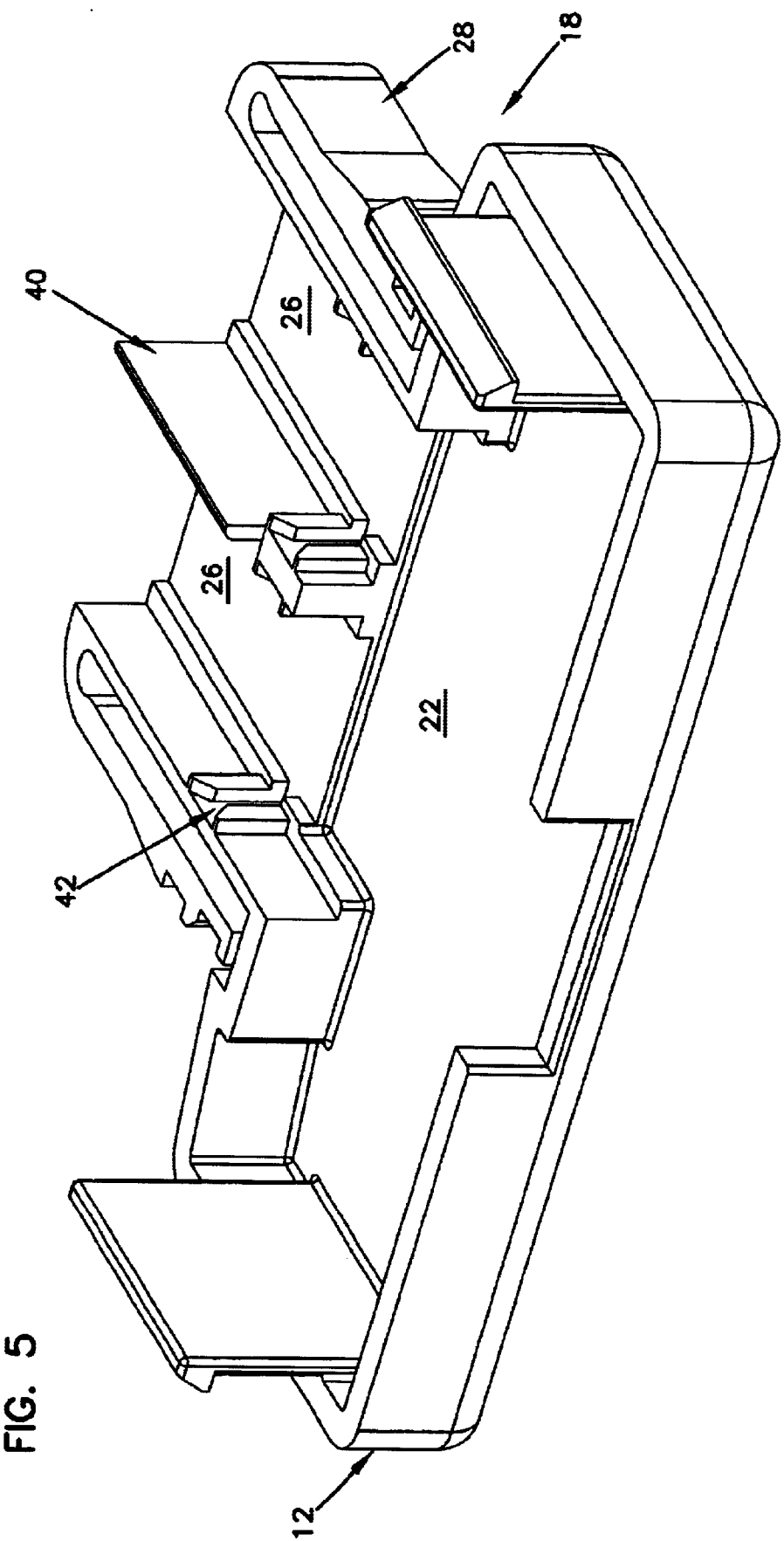
FIG. 5 is a front perspective view of the inside of the top housing member shown in FIG. 4.
Figure 6:
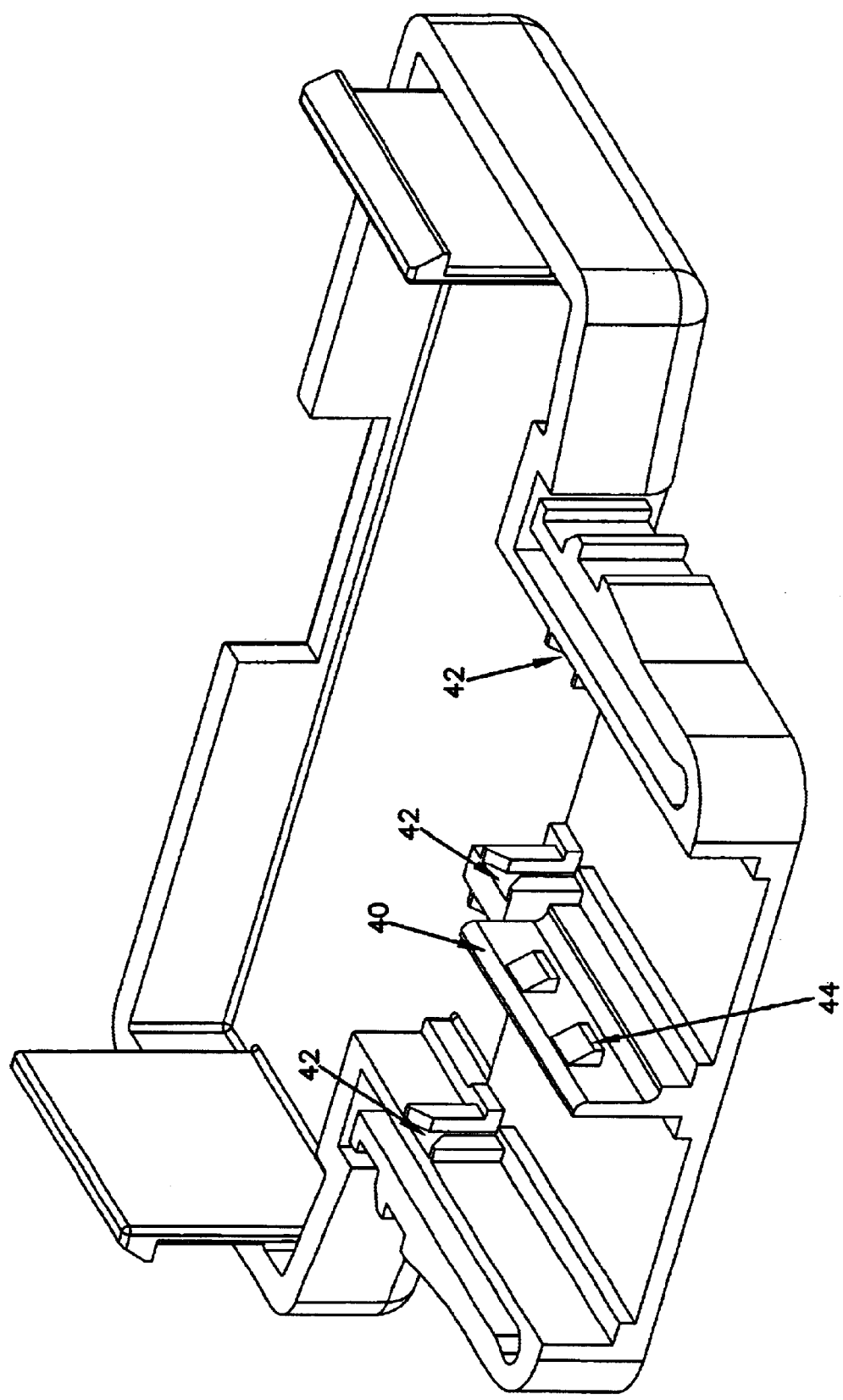
FIG. 6 is a rear perspective view of the inside of the top housing member shown in FIG. 4.

FIG. 5 is a front perspective view of the inside of the top housing member 12 shown in FIG. 4. The rear section 18 has a wall 40 that divides the rear section of the top housing member into two compartments 26. Grooves 42 are also provided at several locations in the rear section 18. FIG. 6 is a rear perspective view of the inside of the top housing member 12 shown in FIG. 4. Located along one side of the wall 40 provided in the rear section are protrusions 44. The protrusions 44 mate with the apertures 38 formed in the wall 32 of the bottom housing member 14 to join the top and bottom housing members together as can be seen in FIG. 1.

The media converter housing 10 is designed to house converter circuitry (see FIGS. 16A and 16B) in the front compartment 22 and optical components (not shown) in the rear compartments 26 as will now be described.

Figure 7:
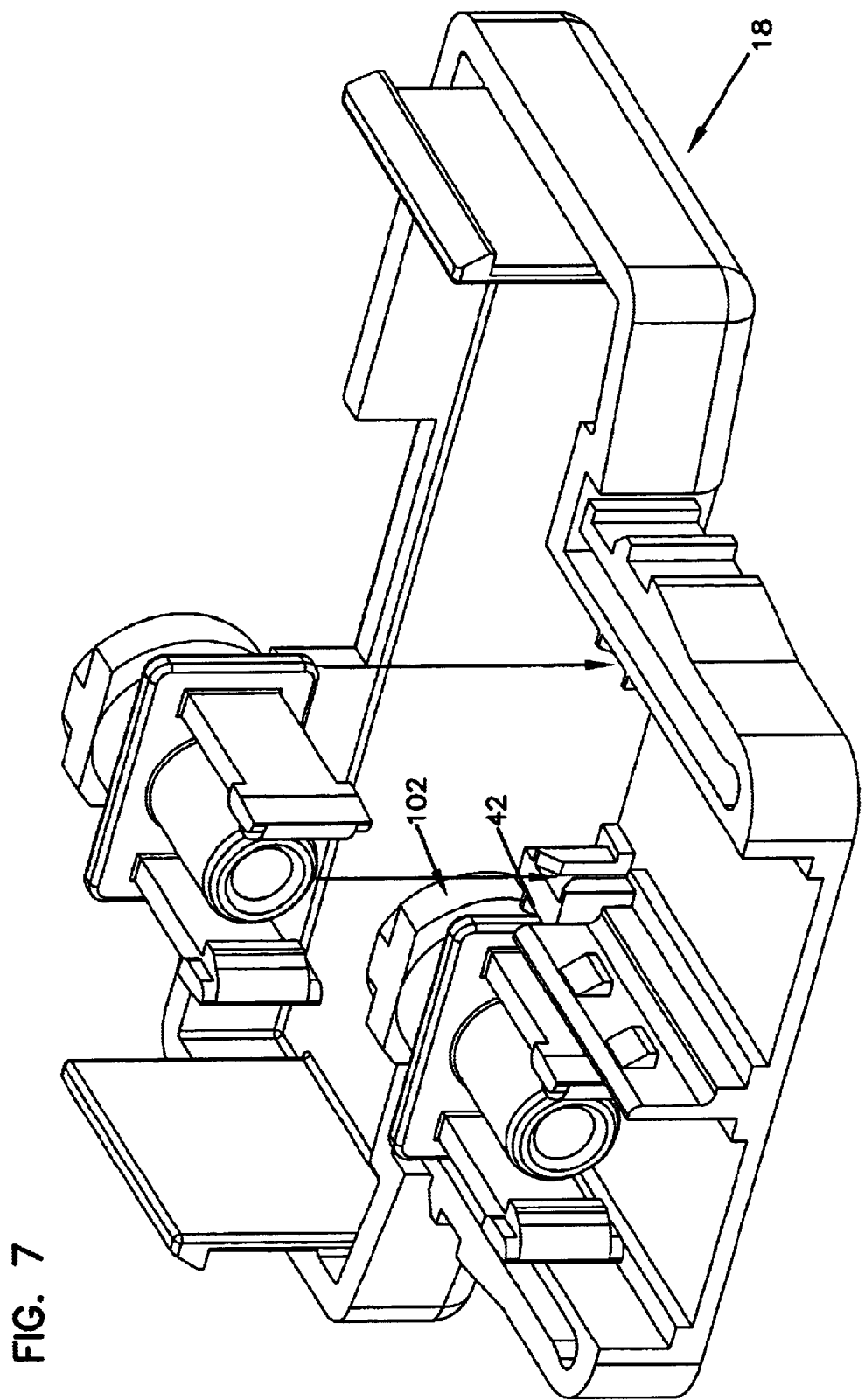
FIG. 7 is a rear perspective view of the top housing member shown in FIG. 4 with one SC latching insert disposed in a rear compartment of the converter housing.
Figure 8:
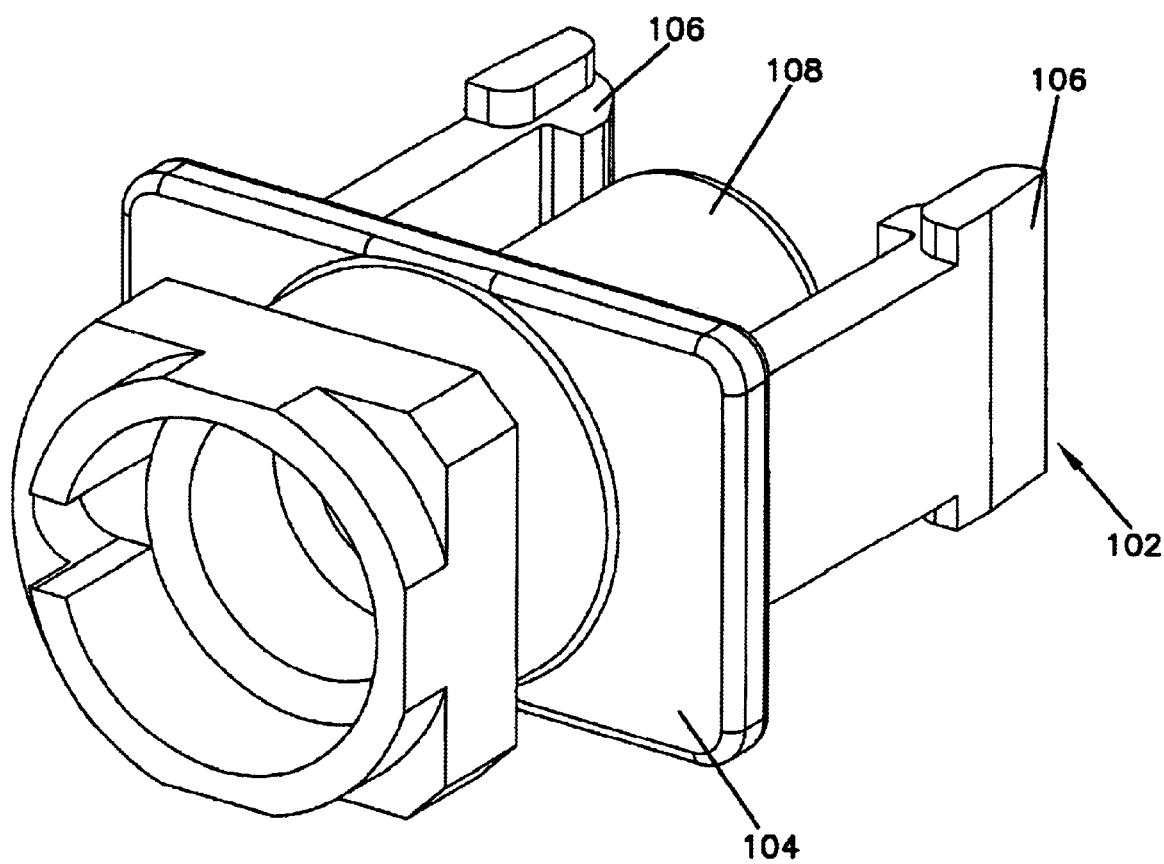
FIG. 8 is a perspective view of an SC latching insert according to a preferred embodiment of the present invention.
Figure 9:
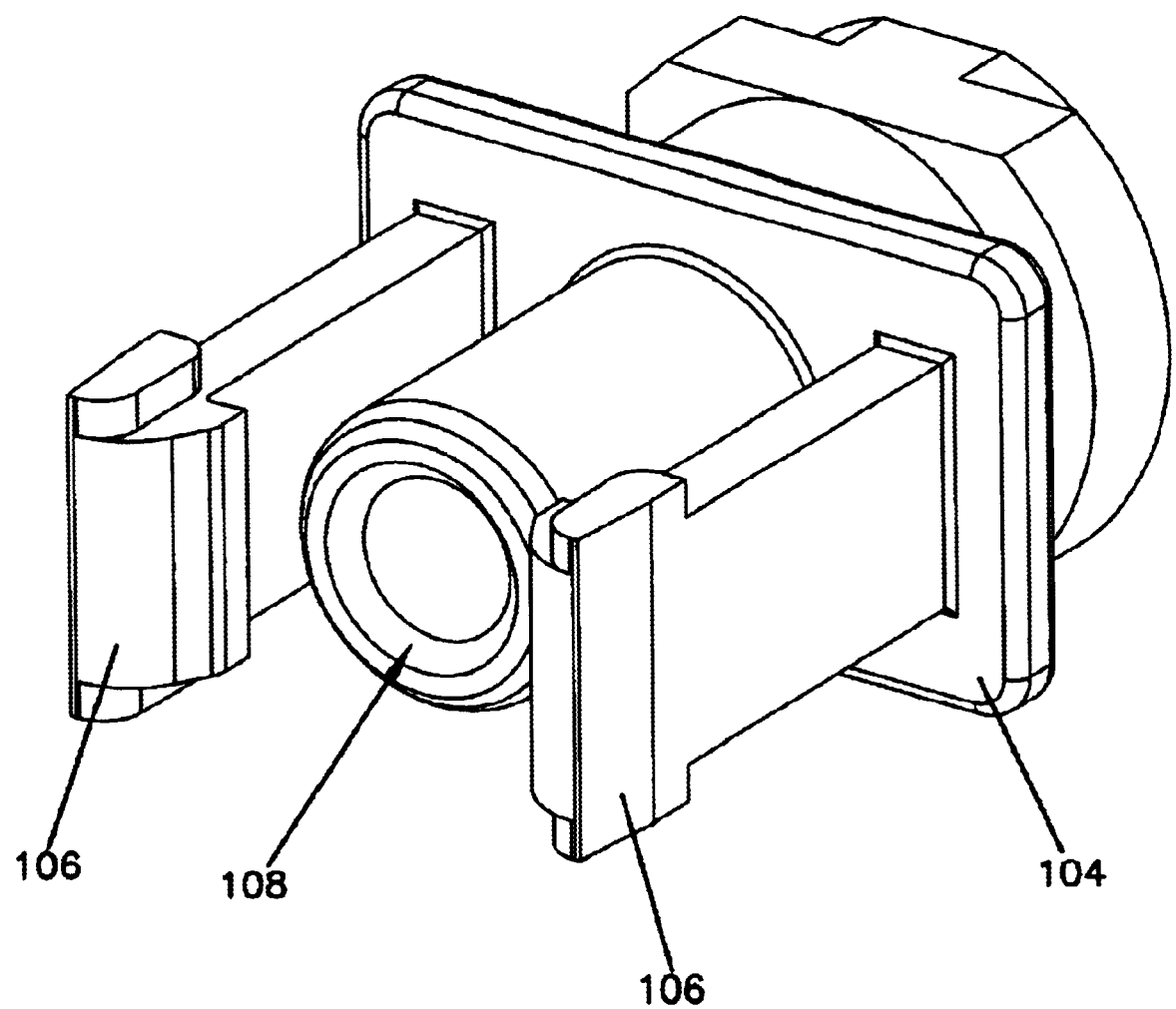
FIG. 9 is a rear perspective view of the insert shown in FIG. 8.

FIG. 7 is a rear perspective view of the top housing member shown in FIG. 4 with one SC latching insert disposed in a rear compartment of the housing. FIGS. 8 and 9 are front and rear perspective views respectively of an SC latching insert according to, a preferred embodiment of the present invention. The insert includes a collar, a pair of latches and a ferrule guide extending through the collar. The collar of the insert is slid into grooves formed in the bottom housing member to properly position the insert in the rear section of the housing as seen in FIG. 7.

By making the circuit assembly upgradeable by simply replacing the daughter board, data rates can be increased and protocols may be changed at a reduced cost since the existing circuit assembly need not be replaced with a new one.

Figure 10:
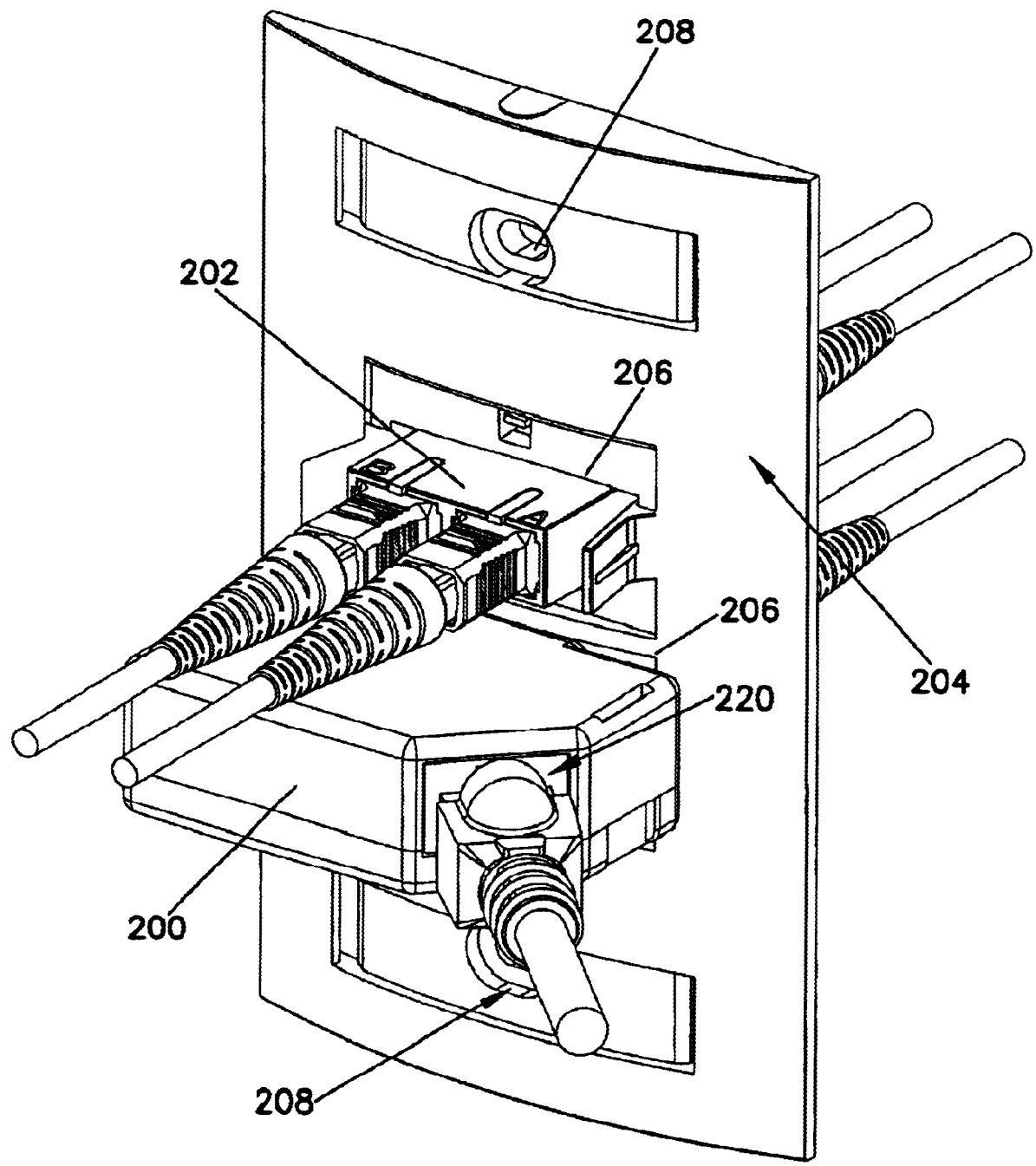
FIGS. 10–12 are front, back and top perspective views respectively of a converter housing according to another preferred embodiment of the present invention along with a standard SC Duplex adapter mounted in a faceplate.
Figure 11:
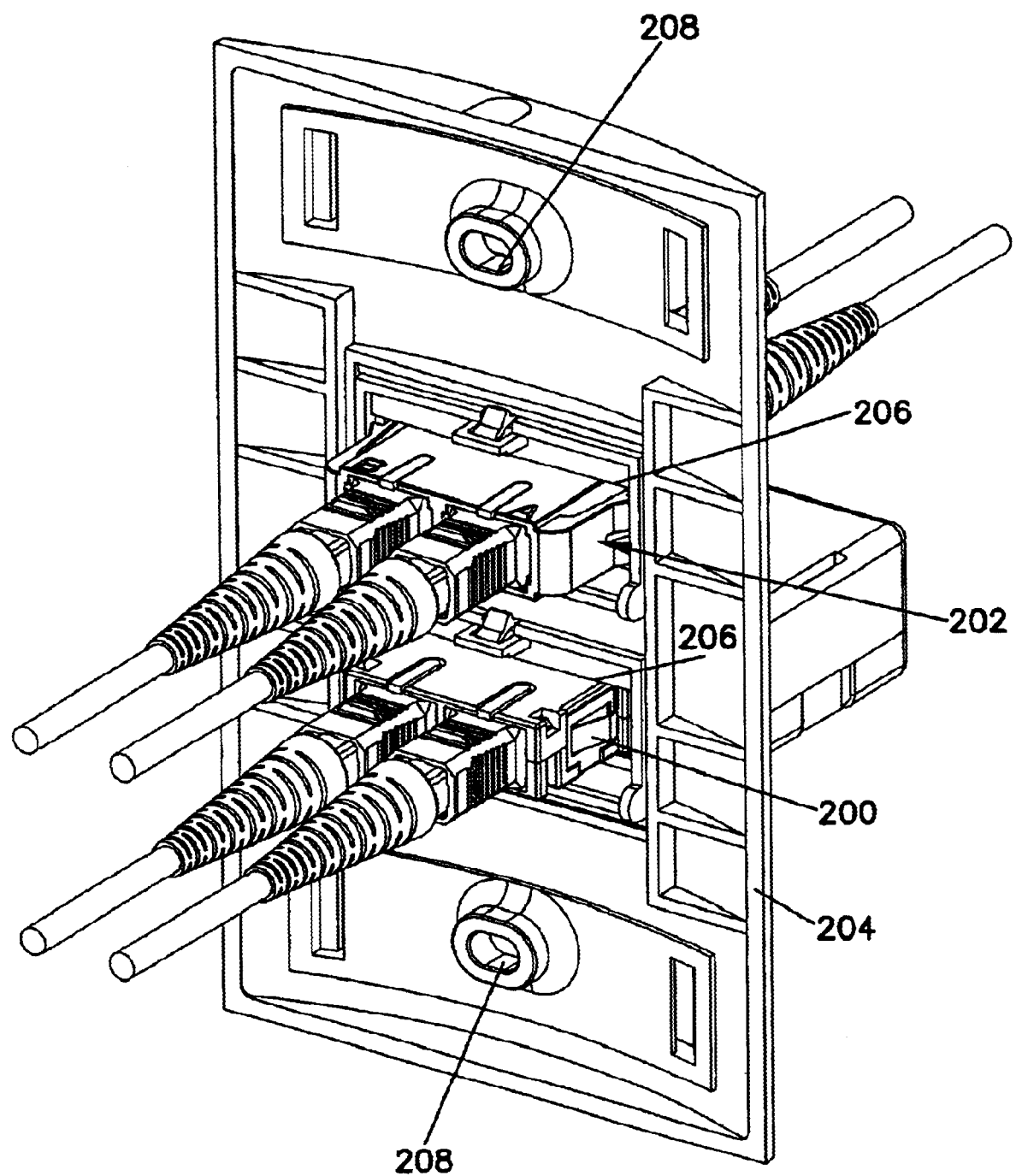
Figure 12:
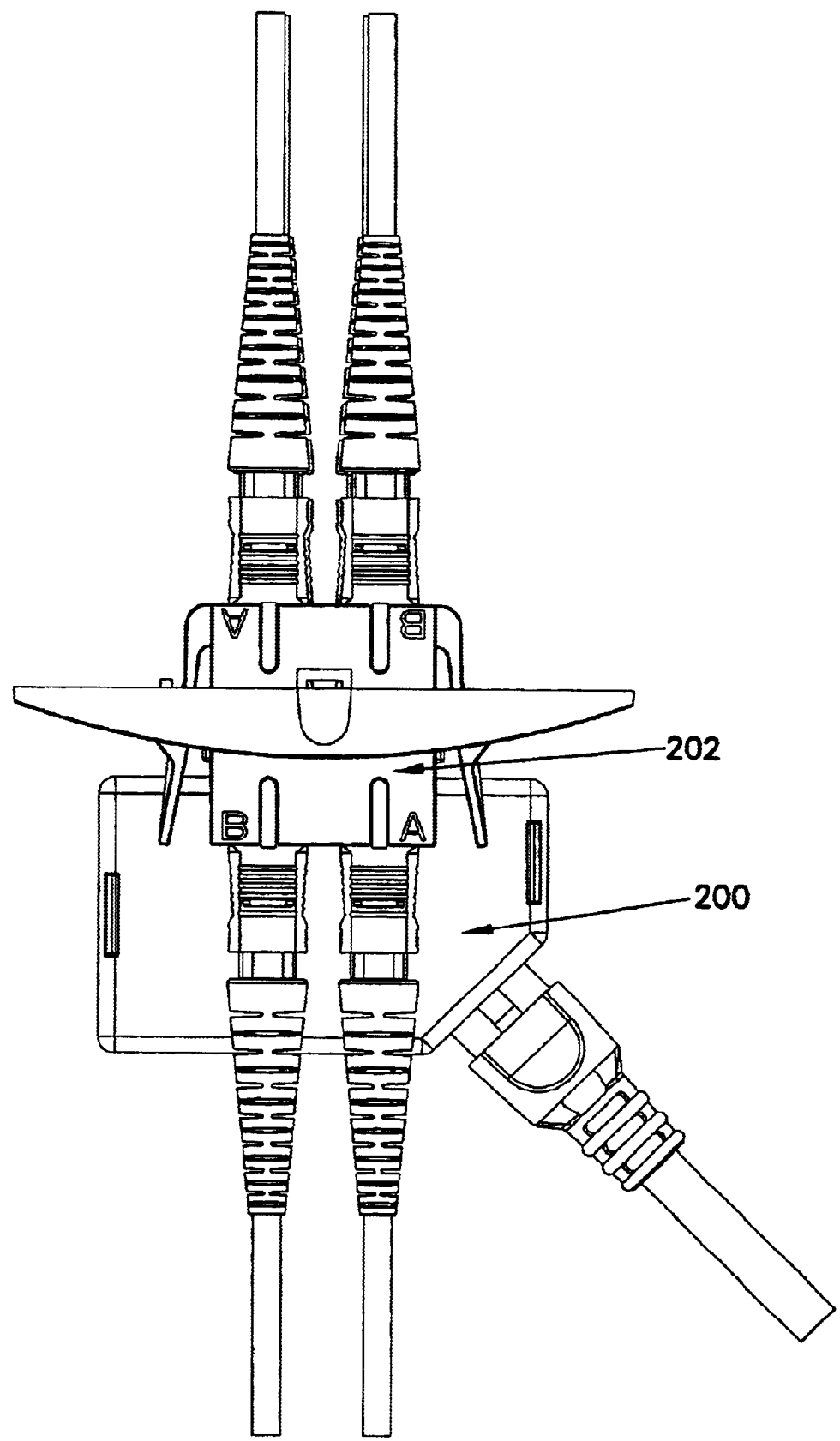

FIGS. 10–12 are front, back and top perspective views respectively of a converter housing according to another preferred embodiment of the present invention along with a standard SC Duplex adapter mounted in a faceplate. The converter housing according to this preferred embodiment has its first port 220 located at an angle with respect to the front section of the housing.

The faceplate 204 has two apertures 206 sized to receive the converter 200 and adapter 202 therein. The faceplate 204 includes holes 208 that allow the faceplate 204 to be bolted, screwed or otherwise connected to a wall.

When the converter housing 200 is inserted into an aperture 206, the spring arms 28 located on the exterior sides of the rear section of the housing 200 are depressed and once they pass through the aperture, they snap back to original shape and engage the faceplate 220 to hold the housing therein as can be seen in FIG. 11. To remove the converter 200 from the faceplate 204, a tool is used to depress the spring arms 28 so that the housing can be removed from the outlet. The housing has an advantage of being tamper-resistant since a tool is required for removal. In a preferred embodiment, the converter housing 200 fits into a 6000 MULTI MEDIA OUTLET commercially available from ADC Telecommunications, inc. of Eden Prairie, Minn. It can be especially appreciated in FIGS. 11 and 12 that the design of the converter housing provides the same fiber depth as a standard SC duplex adapter so that the outlet box does not need to be modified to support the converter housing according to any of the embodiments described herein.

Figure 13:
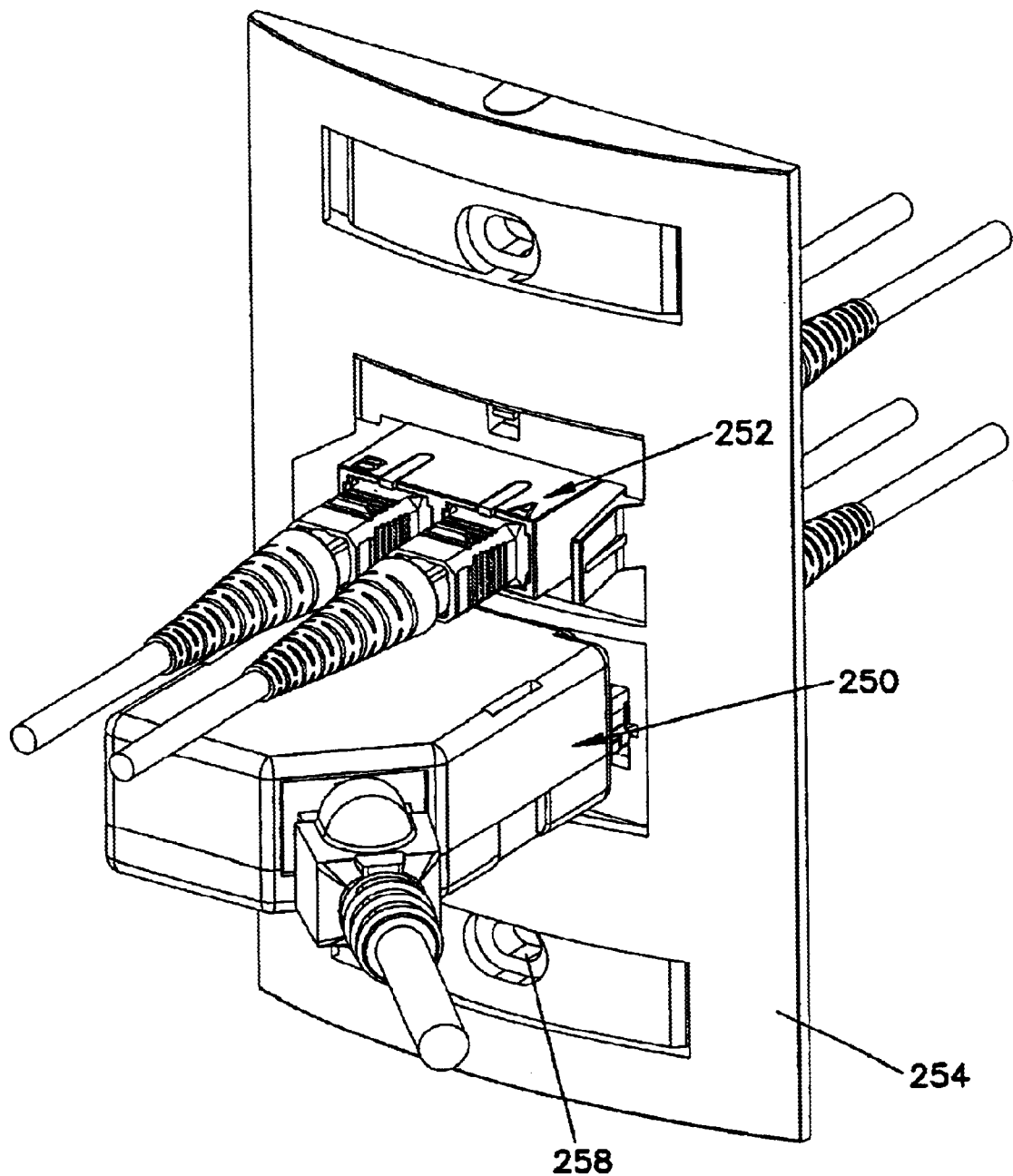
FIGS. 13–15 are front, back and top perspective views respectively of a converter housing according to still another embodiment of the present invention along with a standard SC duplex adapter mounted in a faceplate.
Figure 14:
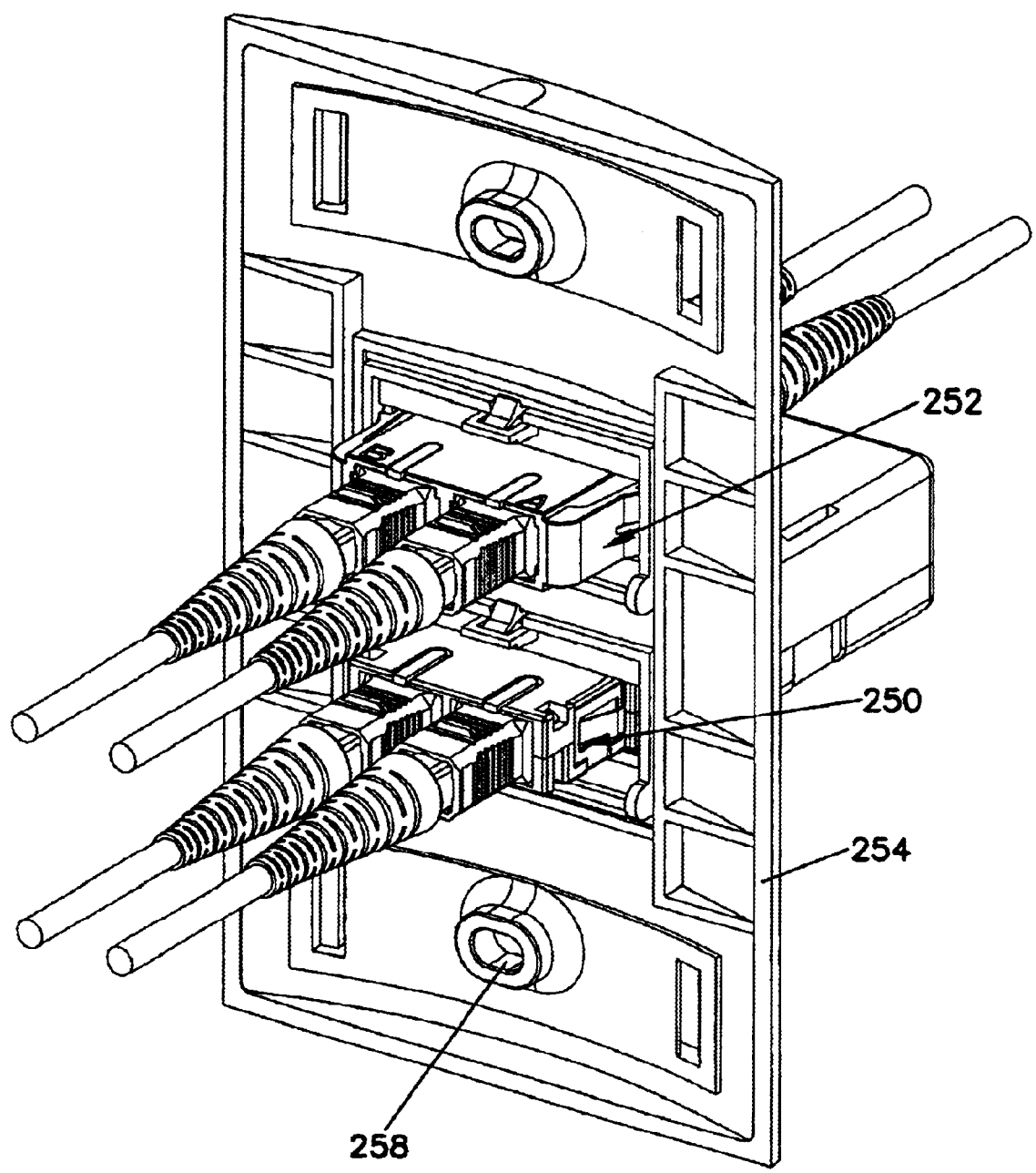
Figure 15:
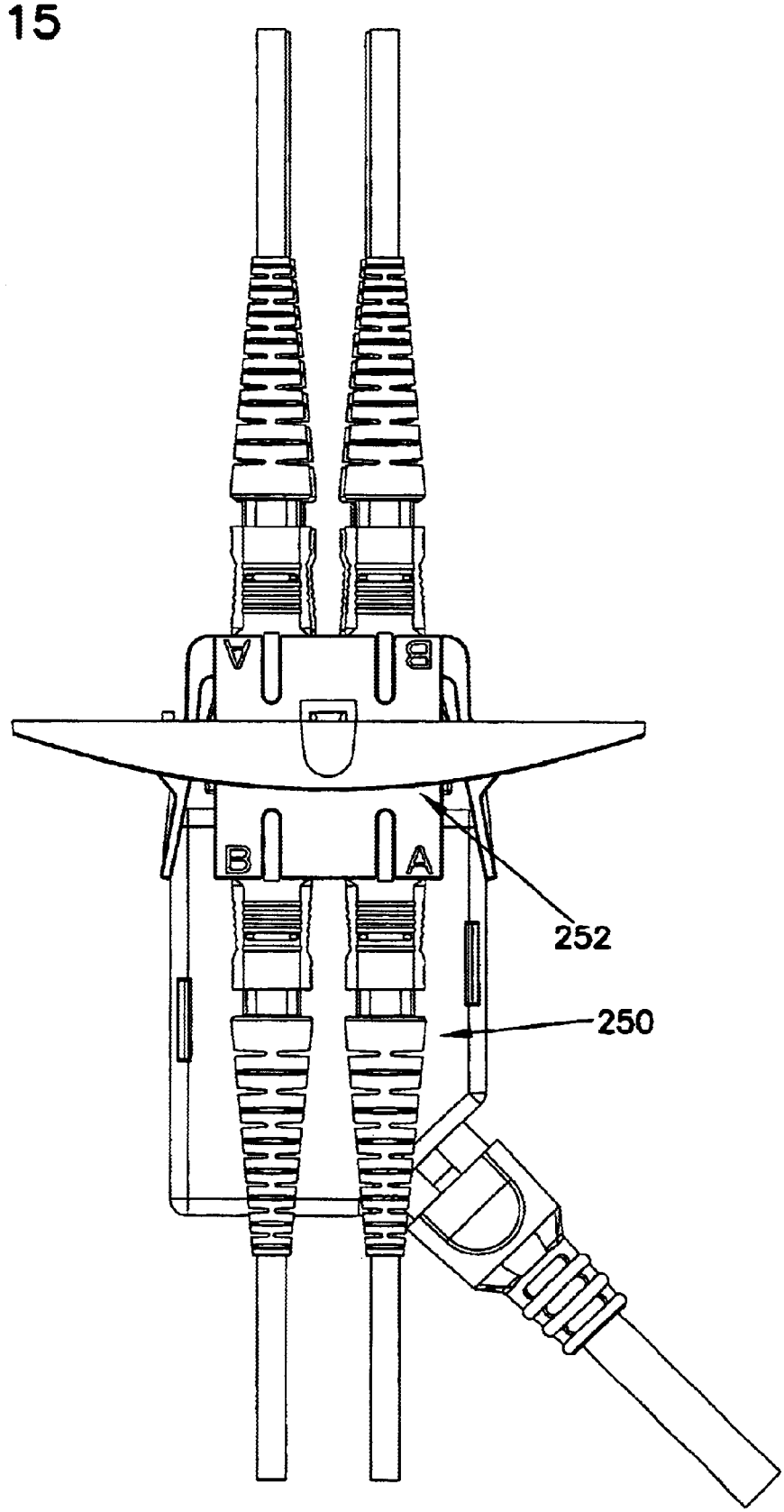

FIGS. 13–15 are front, back and top perspective views respective of a converter housing according to still another embodiment of the present invention along with a standard SC duplex adapter mounted in a faceplate. In this preferred embodiment, the front compartment is larger.

Figure 16B:
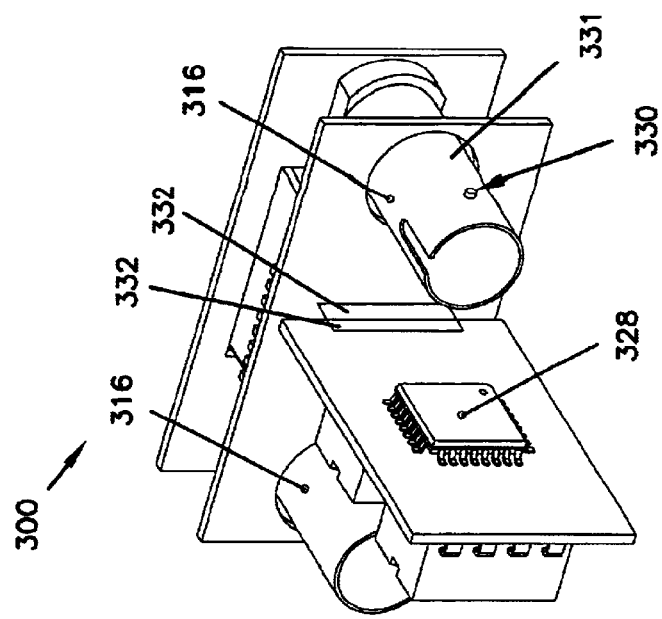
FIG. 16B is a rear perspective view of the circuit assembly shown in FIG. 16A.
Figure 16A:
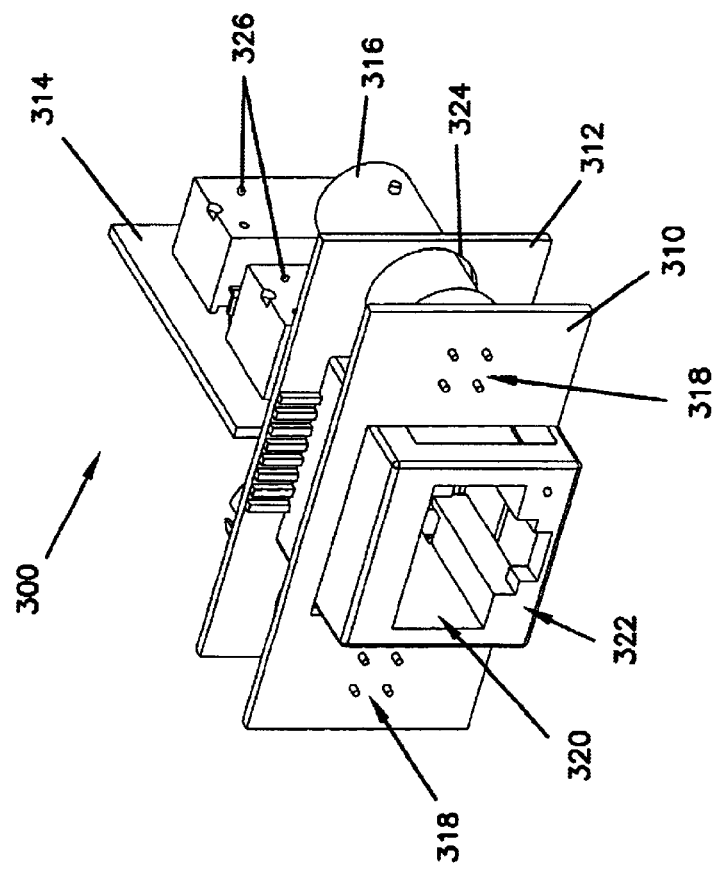
FIG. 16A is a front perspective view of a circuit assembly according to a preferred embodiment of the present invention.

FIG. 16A is a perspective view of a circuit assembly 300 according to another preferred embodiment of the present invention. FIG. 16B is a rear perspective view of the circuit assembly 300 shown in FIG. 16A. In the embodiment shown in FIGS. 16A and 16B, circuit assembly 300 includes a first motherboard 310, a second motherboard 312, and a daughter board 314. The first motherboard 310 has an aperture 320 formed therein through which a jack 322 such as an RJ45 jack fits. The jack 322 is electrically coupled to the second motherboard 312. Electrically coupled to the first motherboard 310 through couplings 318 are two optic fiber connectors 316. The ferrules 331 of the fiber optic connectors 316 extend through apertures 324 formed in the second motherboard 312. Located on one side of the daughter board 314 are filters 326 and located on the other side of the daughter board 314 is a converter chip 328 such as a 10BASE-T, 100 BASE-TX or 1,000 BASE-TX depending on the chip located on the daughterboard 314. The daughter board 314 is electrically coupled to the second motherboard by connectors 332 located on both the daughter board 314 and second motherboard 312. The converter converts electrical signals received by the RJ-45 jack to optical signals and outputs the optical signal through connectors 316 to a fiber optic cable (not shown), and vice versa.

While the present invention has been described as a media converter that converts between electrical and optical signals, the present invention is not limited to that particular converter. For example, the RJ-45 jack can be replaced with a coaxial connector. In addition, the optic connectors may be coupled to single mode or multimode fiber. In addition, optical to optical converters may be used. Thus, conversions may be made between copper and fiber and fiber and fiber.

By providing the converter in a wall mounted housing, regular patch cord extends from the wall unit to a workstation, for example. Thus, special, expensive fiber optic cable is not necessary at the workstation. In addition, because the converter is at the wall outlet, an additional box is not needed between the wall and the terminal equipment which eliminates clutter and cost.

Figure 17:
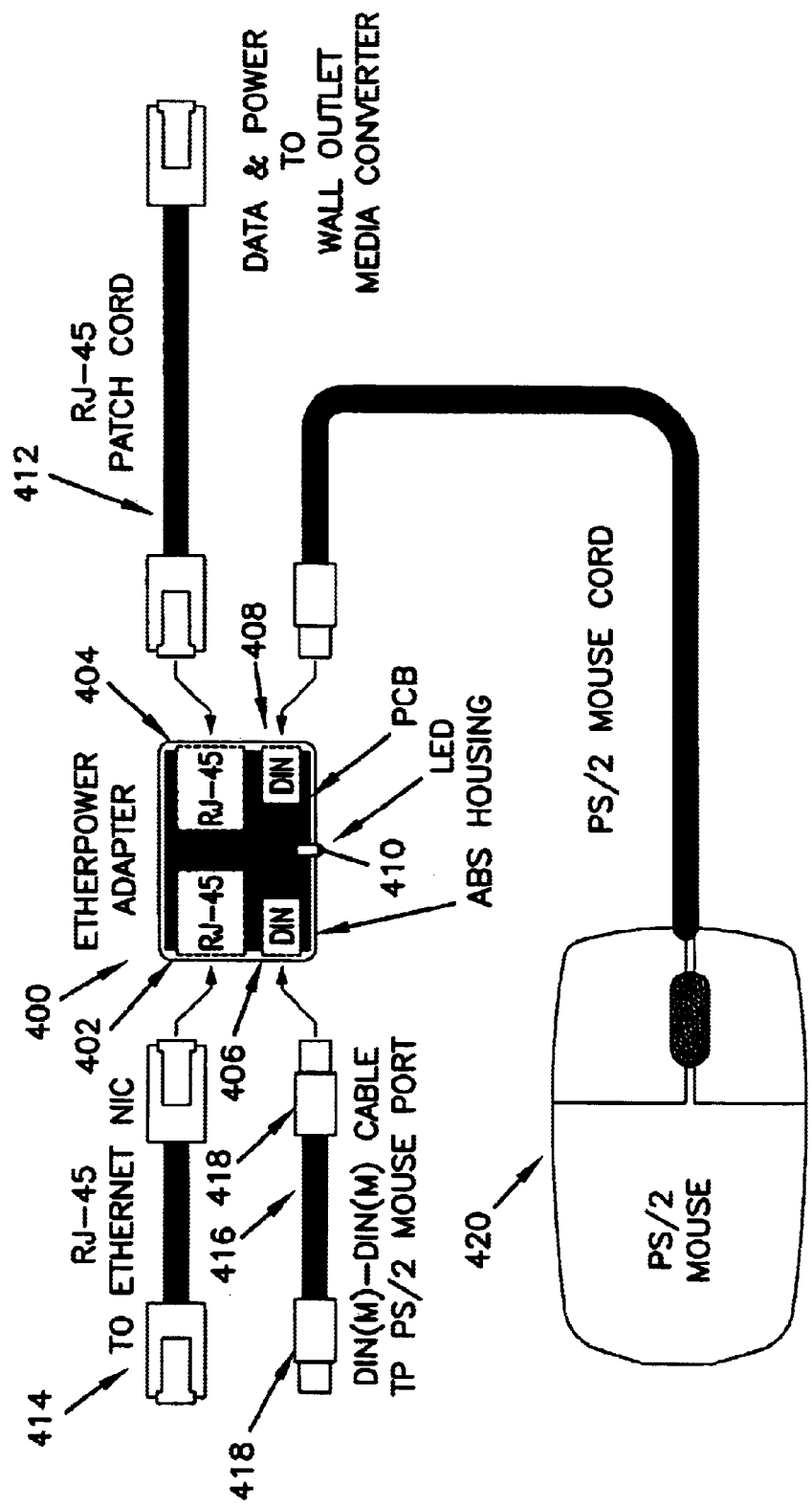
FIG. 17 is a schematic illustration of an adapter used to power the media converter of the present invention.

The converter can be powered remotely from a device coupled to the patch cord using unused wire pairs in the patch cord. More particularly, FIG. 17 is a schematic illustration of an adapter 400 used to power the media converter of the present invention. The adapter is a device that consists of a plastic housing, a printed circuit board (not shown), two miniature DIN connectors 406, 408, two RJ-45 jacks 402, 404, a resistor (not shown), and an LED 410. All of the connectors and components are assembled onto the printed circuit board. The plastic housing is designed to encase the printed circuit board assembly leaving an opening on each end for access to the miniature DIN connectors 406, 408 and RJ-45 jacks 402, 404 to facilitate cable connection.

The adapter 400 is designed to allow an external or ancillary network device such as the media converter of the present invention to receive power via the unused conductors in a RJ-45 patch cord 412. Power is obtained from a PC mouse port (not shown) coupled to the adapter 400 via RJ-45 cable 414. This is accomplished by coupling the PC mouse port 406 and the port from a network interface card 402 through the adapter 400. The mouse port 406 is connected to the adapter 400 via a 1m, 6-conductor cable 416 using male miniature DIN connectors 418 on each end. The network interface card port (not shown) is connected to port 402 via a 1m RJ-45 patch cord 414. Ports 402, 406 provide the PC inputs to the adapter 400. The PC mouse 420 or pointing device is connected to the adapter 400 on the output side through port 408. The external or ancillary network device such as the media converter 400 is connected to the adapter via a standard RJ-45 patch cord 412.

Figure 18:
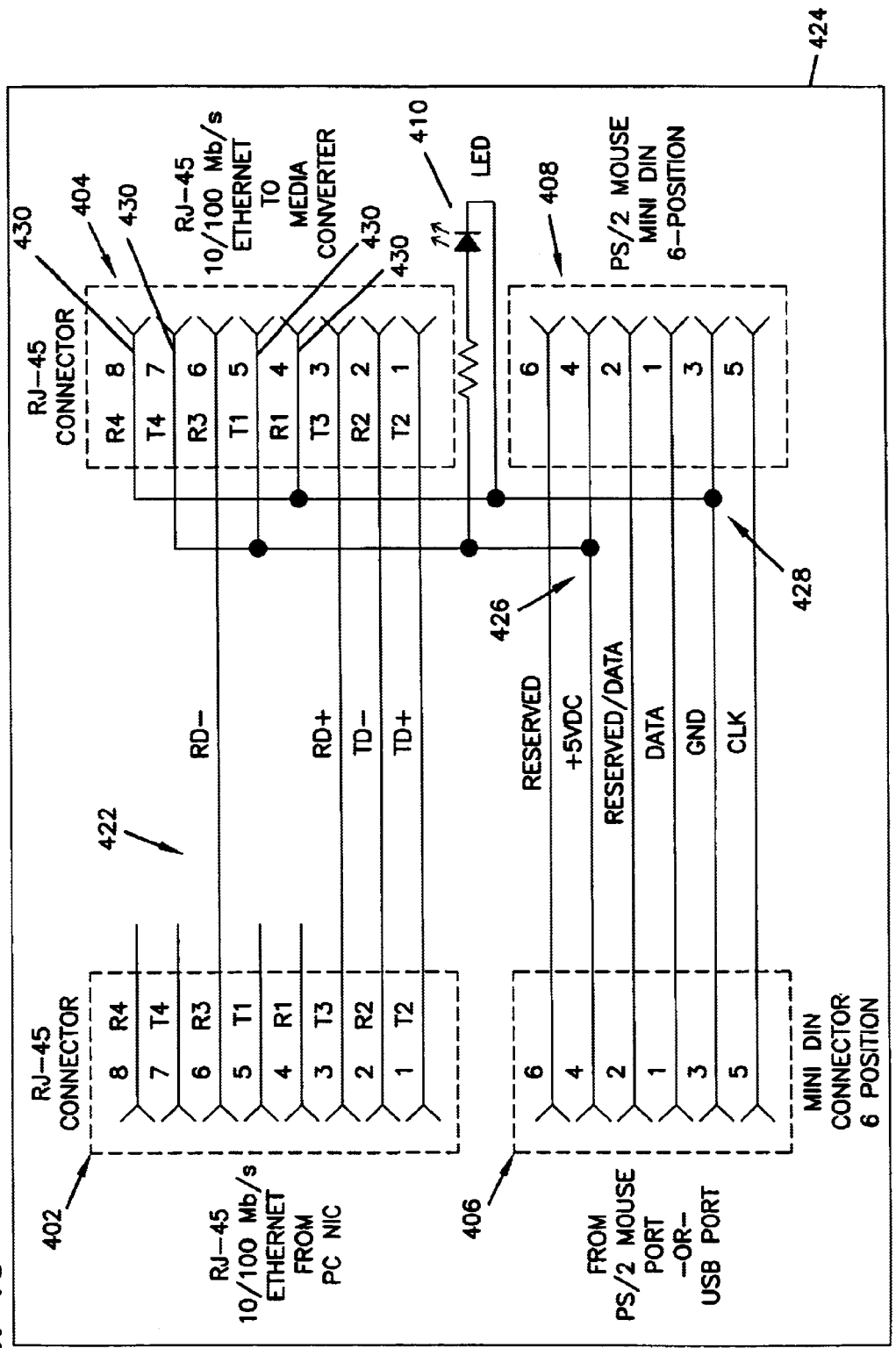
FIG. 18 is a wiring schematic of the adapter shown in FIG. 17.

FIG. 18 is a wiring schematic of the adapter shown in FIG. 17. The interconnection of the connectors through port 408 is accomplished by conductor traces 422 according to the present invention on a printed circuit board 424. The signal pins for the DIN connectors 402–408 are passed through on pin-for-pin basis. The +5 VDC (pin 4) 426 and GROUND (pin 3) 428 from the mouse port 406, 408 and RJ-45 jacks 402, 404 are tapped and connected to the unused pins 430 of the output RJ-45 jack 404. Since most local area network systems require only two pairs, one for transmit and one for receive, the unused pairs are used to supply +5 VDC and GROUND to an external or ancillary network device such as a media converter according to the present invention.

An LED indicator 410 is visible on one side of the adapter 400. The LED 410 is powered by the +5 VDC obtained from the PC mouse port 406 and serves as a "power on" indicator.

The adapter 400 allows an external or ancillary network device to be powered from a PC without the use of an external power supply and without the need for a secondary power cord. Using the adapter 400, external or ancillary devices can be powered up to 90 meters away from the PC. This allows the external device to be located anywhere within the standard cable limits as defined by TIA/EIA 568B. Providing power by this technique is also a safety improvement. Since no external power supply is required, the external device is only active when the PC is powered up. When the PC is powered down, so is the remote device.

The elimination of the external power supply as well as a local optical patch cord reduces the number extra AC outlets required in the vicinity of the PC. This reduces cost, workstation clutter, and congestion in cable raceways, especially in modular furniture applications. In addition, unlike other media converters, a discrete unit is not needed, the conversion takes place at the work area wall plate. Because the optical interface is located in the rear section of the housing, when the housing is mounted in the wall outlet the optical connections are located behind the wall outlet. Also, by keeping the circuit assembly located in the front section of the housing, the portion of the adapter that extends behind the wall plate has the same footprint or profile as a standard SC duplex adapter so the wall box does not need to be modified to accommodate the media converter housing according to the preferred embodiments of the present invention.

Because the ferrule located in the optical receptacle allows the wall outlet to be equipped with short or long wavelength LED or laser devices allowing the same style of wall outlet to be used in numerous optical applications.

Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A media converter housing comprising:
    a front section having a first compartment configured to house a printed circuit board for converting signals from one protocol to another; and
    a rear section having a second compartment configured to house a portion of an optical termination, the rear section having an external shape configured to fit in a wall outlet receptacle so that when the media converter is mounted in a wall outlet receptacle, the front section protrudes from the wall outlet receptacle; and
    a pair of spring arms on opposite exterior surfaces of the rear section, wherein each spring arm comprises:
        a hinge point and an end opposite the hinge point, wherein the hinge point is attached to the rear section, at an end of the rear section opposite the front section, such that the end of the spring arm opposite the hinge point extends toward the front section; and
        an exterior surface that, from the hinge point toward the end of the spring arm opposite the hinge point, diverges away from the rear section, and wherein in at least one location along the exterior surface of the spring arm, the exterior surface converges toward the rear section, creating a protrusion on the exterior surface of the spring arm.

2. The housing of claim 1 wherein the front section has a port for receiving a first connector.

3. The housing of claim 2 wherein the first connector is a RJ-45 connector.

4. The housing of claim 1 wherein the rear section has a port for receiving a second connector.

5. The housing of claim 4 wherein the second connector is a fiber connector.

6. The housing of claim 5 wherein the fiber connector is single mode.

7. The housing of claim 5 wherein the fiber connector is multimode.

8. The housing of claim 1 wherein the front section has a port for receiving a first connector and the rear section has a port for receiving a second connector.

9. The housing of claim 8 wherein the first connector is an electrical connector and the second connector is an optical connector.

10. The housing of claim 1 wherein the front and rear sections are made of plastic.

11. A media converter housing comprising:
    a front section having a first compartment for housing circuitry for converting signals from one protocol to another;
    a rear section having a second compartment configured to house a portion of an optical termination, the rear section having a same footprint as a standard SC duplex adapter wherein the rear section fits in an optical outlet receptacle; and a pair of spring arms on opposite exterior surfaces of the rear section, wherein the spring arms comprise:
  hinge points attaching the spring arms to the rear section at an end of the rear section opposite the front section;
  at least one protrusion on each of the opposite exterior surfaces of the spring arms; and
  opposing exterior surfaces that, beginning at the hinge points and extending to the at least one protrusion, diverge away from the rear section, creating an outwardly sloped exterior surface.

12. A media converter housing comprising:
a front section having a first compartment configured to house a printed circuit board for converting signals from one protocol to another;
a rear section having a second compartment configured to house a portion of an optical termination, the rear section having an external shape configured to fit in a wall outlet receptacle so that when the media converter is mounted in a wall outlet receptacle, the front section protrudes from the wall outlet receptacle; and
a circuit assembly located within the first compartment of the housing, the circuit assembly comprising:
  a first connector mounted on a motherboard for transmitting and receiving signals in a first format;
  a second connector mounted on the motherboard for transmitting and receiving signals in a second format wherein the second format is different than the first format; and
  a converter mounted on a daughter board electrically coupled to the first and second connectors on the motherboard wherein the converter converts signals received in the first format to the second format and vice versa and wherein the daughter board is releasably connected to the motherboard.

13. The housing of claim 12 wherein the first format is transmitted and received over unshielded twisted pair wire and the second format is transmitted and received over fiber optic cable.

14. The housing of claim 12 wherein the first connector is a RJ-45 connector and the second connector is a single mode fiber connector.

15. The housing of claim 12 wherein the first connector is an RJ-45 connector and the second connector is a multimode fiber connector.

16. The housing of claim 12 wherein the first connector is a single mode fiber connector and the second connector is a multimode fiber connector.

17. The housing of claim 12 wherein the first connector is a coaxial connector and the second connector is an RJ-45 connector.

18. The housing of claim 12 wherein the first connector is an electrical connector and the second connector is an optical connector.

19. The housing of claim 12 wherein the circuit assembly receives power through a patch cord coupled to the first connector.

20. The housing of claim 12 wherein the converter receives power from a device external to the converter but coupled to the converter through the first connector.

21. The housing of claim 12 wherein the first connector is an optical connector and the second connector is an optical connector.

22. The housing of claim 12 wherein the converter converts at a predetermined speed of 10BASE-T.

23. The housing of claim 12 wherein the converter converts at a predetermined speed of 1,000BASE-TX.

24. The housing of claim 12 wherein the converter converts at a predetermined speed of 1,000BASE-TX.

25. The housing of claim 1 wherein the rear section has the same footprint as a standard SC duplex adapter.

26. The housing of claim 1 further comprising:
a circuit assembly located within the first compartment of the housing, the circuit assembly comprising:
  a first connector mounted on a motherboard for transmitting and receiving signals in a first format;
  a second connector mounted on the motherboard for transmitting and receiving signals in a second format wherein the second format is different than the first format; and
  a converter mounted on a daughter board electrically coupled to the first and second connectors on the motherboard wherein the converter converts signals received in the first format to the second format and vice versa and wherein the daughter board is releasably connected to the motherboard.

* * * * *